Figure 1:
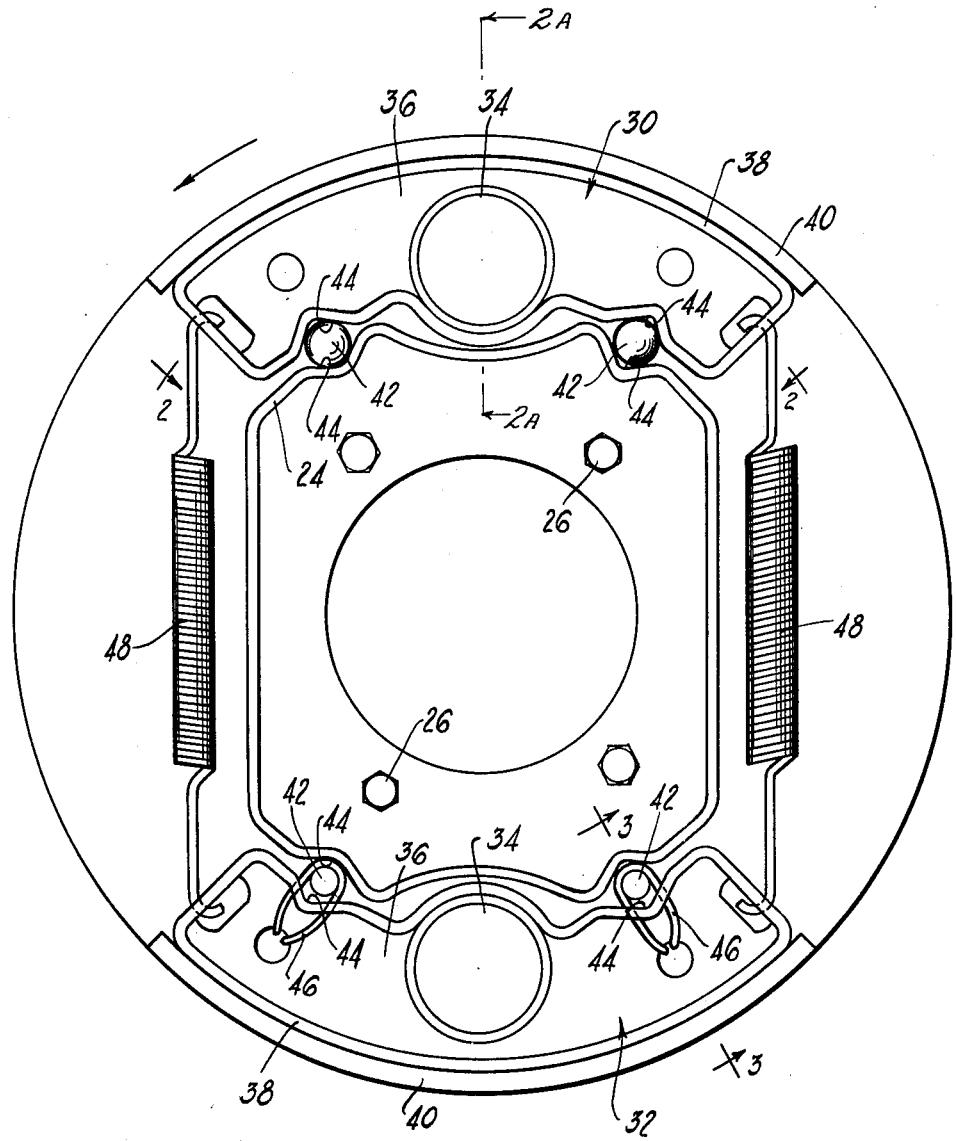

Dec. 1, 1959          J. L. MOSSEY          2,915,145
KINETIC-ENERGY-ABSORBING DEVICE

Filed June 1, 1954          3 Sheets-Sheet 1

INVENTOR.
JOSEPH L. MOSSEY
BY
John A. Young
ATTORNEY

Dec. 1, 1959  J. L. MOSSEY  2,915,145
KINETIC-ENERGY-ABSORBING DEVICE
Filed June 1, 1954  3 Sheets-Sheet 2

INVENTOR.
JOSEPH L. MOSSEY
BY
John A. Young
ATTORNEY

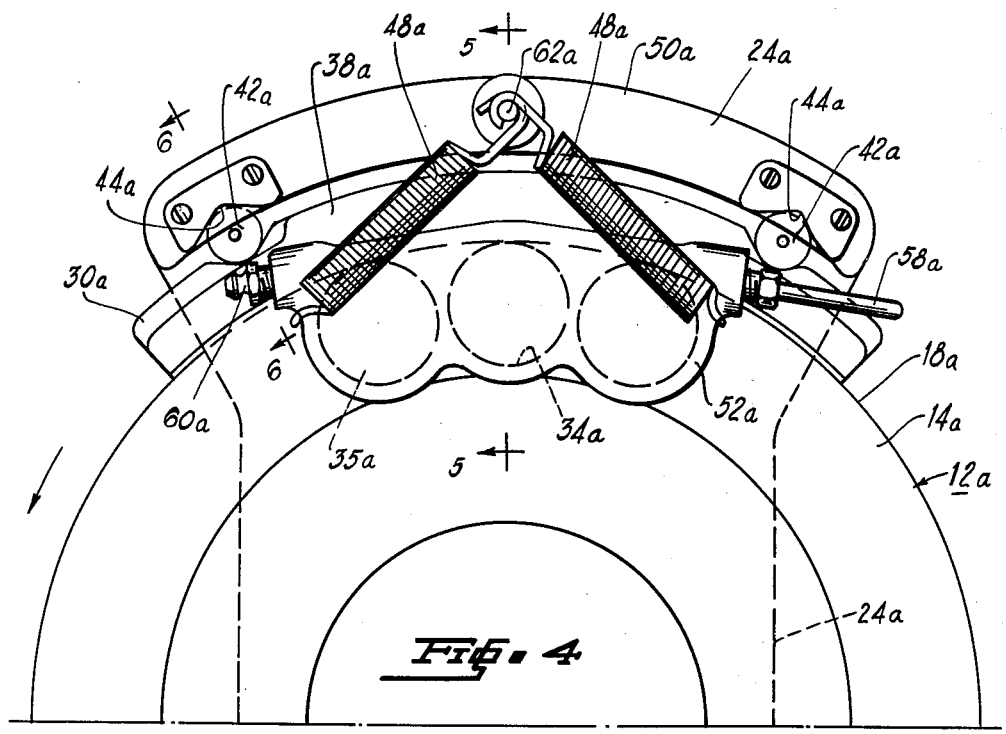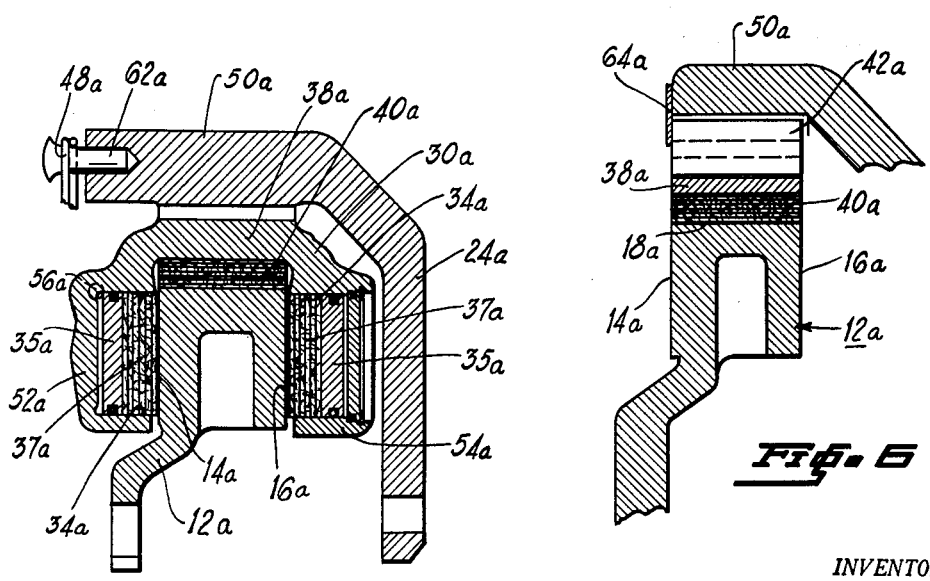

United States Patent Office

2,915,145
Patented Dec. 1, 1959

2,915,145

KINETIC-ENERGY-ABSORBING DEVICE

Joseph L. Mossey, South Bend, Ind., assignor to Bendix Aviation Corporation, South Bend, Ind., a corporation of Delaware Application June 1, 1954, Serial No. 433,324

13 Claims. (Cl. 188—70)

This invention relates to brakes and is illustrated in combination with friction units embodying disk and shoe brake principles, the disk brake element serving as actuator for the shoe brake element of the unit.

An object of this invention is to secure in a single brake mechanism the desirable operating characteristics of both disk and shoe (or drum) brakes.

From a performance standpoint it is my aim to relate the actuating characteristics of the brake to disk brake principles and hence obtain: low pedal travel loss, braking effectiveness proportional to pedal effort (to make for greater controllability), and reduced initial effort for applying the brake.

From another performance standpoint it is my aim to increase the effectiveness of the brake through use of a shoe brake element to realize a preferred degree of self-energization, and secondly by utilizing mechanical advantage camming devices which harness the torque reaction from the disk brake element as applying effort on said shoe brake element.

It is a principal object of the invention to reduce overall operating temperatures of the brake and therefore eliminate to a marked degree adverse thermal effects, chief of which is loss in brake effectiveness and pedal travel loss.

Another object of the invention is to obtain a dual function of certain camming devices which serve both as actuator for the brake and also as anchoring means.

The above and other objects and features of the invention will appear more fully hereinafter from a consideration of the following description, taken in connected with the accompanying drawings wherein a plurality of embodiments of the invention are illustrated by way of example.

Figure 2:
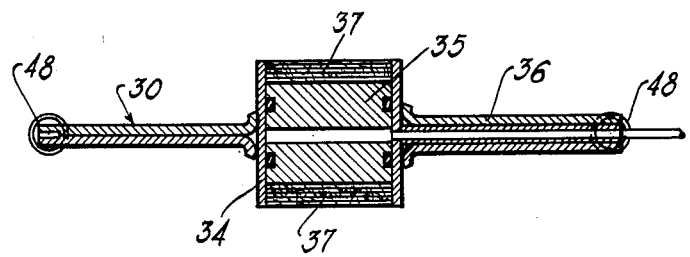
Figure 2A:
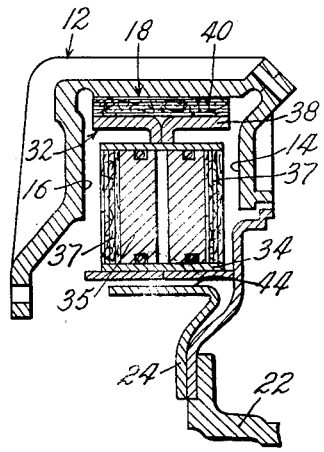
Figure 3:
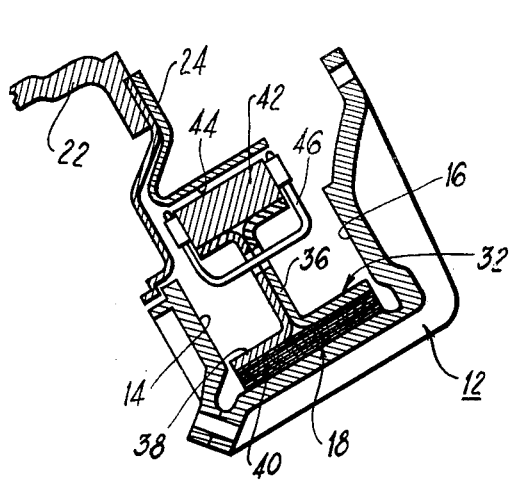

In the drawings:

Figure 1 is a side elevation of the brake assembly;

Figures 2 and 3 are section views taken on the lines 2—2 and 3—3 respectively of Figure 1;

Figure 4 is a fragmentary view of a second embodiment of the invention showing different location of the brake unit in combination with a modified rotor construction; and, Figures 5 and 6 are section views taken on the lines 5—5 and 6—6 indicated on Figure 4.

Considering first the embodiment illustrated in Figures 1 to 3, the brake assembly includes a rotor 12 having friction element engaging surfaces 14, 16 and 18, the rotor being suitably secured to a rotatable part of the vehicle, such as an axle (not shown). The rotor 12 is sometimes referred to by those in the art as a drum, the two terms drum and rotor are interchangeably used in this disclosure, since one is the equivalent of the other.

A stator 24 which serves as a torque-taking member, is fixedly secured by suitable fastening devices designated at 26 to a nonrotatable part of the vehicle such as the axle housing 22.

Movement of the rotor 12 in either direction is inhibited by two brake units 30 and 32 each of which consists of a cylinder 34 transversely received in a web 36 provided with a rim 38 having friction material lining 40 thereon. Reciprocably received in each cylinder 34 are a pair of oppositely acting pistons 35 having friction material facing 37.

Interposed between each of the units 30 and 32 and torque taking member 24 are a plurality of rollers 42 mounted on oppositely facing ramps 44 formed in the torque taking member 24 and sides of the units. Retaining clips 46 connected to both ends of the rollers 42 and positioned in the brake units may be used to prevent lateral movement of the rollers 42.

A pair of return springs 48 interconnects the ends of units 30 and 32 to urge the friction material lined rims 38 of the respective units to retracted position out of engagement with surface 18 of the rotor 12.

It will be noted that the friction material lined rim 38 of each of the units forms a "shoe portion" thereof and will hereinafter be referred to as such.

Referring next to the embodiment illustrated in Figures 4 to 6, parts of the brake assembly corresponding to those previously described will be referred to by the same reference numeral with the subscript a affixed thereto.

A rotor 12a having friction material engaging surfaces 14a, 16a and 18a is secured to a rotatable part of the vehicle such as an axle (not shown).

A nonrotatable torque-taking member 24a having a transverse laterally extending flange 50a is secured to a fixed part of the vehicle such as an axle housing (not shown).

For impeding either direction of rotor movement, I provide a U-shaped cross section brake unit 30a consisting of two axially spaced side plates 52a and 54a joined by an arcuate rim 38a having friction material lining 40a on the underside thereof engageable with surface 18a of rotor 12a.

Reciprocably received in sides 52a and 54a of the friction unit 30a are a plurality of pistons 35a having friction material facting 37a engageable with surfaces 14a and 16a of the rotor 12a.

Interposed between the flange 50a and rim 38a of brake unit 30a are a pair of rollers 42a received in oppositely facing ramps 44a formed in the flange 50a and rim 38a.

To actuate the pistons 35a received in sides 52a and 54a I provide passages 56a communicating with each of the cylinder bores 34a. A conduit 58a interconnects passages 56a in the sides 52a, 54a. Hydraulic fluid enters the system through passage 56a in side 54a and the hydraulic circuit terminates with a bleed valve 60a located at the end of conduit 56a on side 52a of the brake unit 30a.

To retract the friction material lined rim 38a of the brake unit, I provide two return springs 48a which are fastened between opposite ends of side 52a and a post 62a positioned in the flange 50a. The two springs 48a urged the unit 30a upwardly and disengage lining 40a from contact with the surface 18a of the rotor 12a.

The brake unit 30a may be constructed with reciprocable friction elements 35a in only one side 54a of the brake unit, the inboard side of the vehicle. Spreading of pistons 35a into contact with the side 16a of the rotor 12a then causes the entire unit 30a to shift laterally to the right thereby engaging the lining on the left hand side 52a of the brake unit with surface 14a of the rotor 12a. This lateral motion of the brake unit 30a is produced by sliding movement of the rim 38a on rollers 42a which are retained against axial movement by retainer plates 64a fastened to flange 50a.

To apply the brake shown in Figures 1 to 3, fluid pressure generated in a master cylinder source (not shown)

is transmitted to cylinders 34 spreading the pairs of pistons 35 apart bringing the facing 37 into forcible engagement with the spaced sides 14 and 16 of the rotor 12. Assuming direction of motion of the rotor indicated by the arrow in Figure 1, the engagement of the facing 37 with surfaces 14 and 16 of the rotor, will tend to cause each of the friction units 30 and 32 to move circumferentially with the rotor 12 in a counterclockwise direction. This tendency of the friction units 30 and 32 to shift with the rotor is translated into a radial thrust on the units 30 and 32 by the camming devices 42. This radial thrust on friction units brings the friction material lined rims 38 into forcible engagement with the surface 18 of the rotor 12. The operation of each of the brake units 30 and 32 is identical. The two units combine to absorb the kinetic energy required to reduce the speed or stop the rotation of the rotor 12.

When the brake is released, return springs 48 yieldably urge the friction material lined rim 38 to retracted position disengaging the lining 40 from contact with surface 18 of the rotor 12.

In opposite direction of drum rotation, contact of the facing 37 on the pistons 35 with sides 14 and 16 imposes clockwise actuating force on the units 30 and 32 whereupon camming devices 42 translate movement of the units into radial thrust applying the shoe portions against surface 18 of rotor 12 in the same manner previously described.

To apply the brake illustrated in Figures 4 to 6, fluid pressure is generated by the operator and introduced to the brake unit 30a through passage 56a in side 54a where it is distributed to each of the cylinder bores in both of the sides 52a and 54a. The pistons 35a are forced toward the rotor 12a bringing the facing 37a into forcible engagement with the surfaces 14a and 16a of rotor 12a. Assuming a direction of rotation of the rotor indicated by the arrow in Figure 4, engagement of the facing 37a on the pistons 35a will impose a counterclockwise actuating force on the friction unit 30a whereupon camming devices 42a will translate movement of the brake unit into radial thrust bringing the friction material lined rim 38a (the shoe portion) into forcible engagement with surface 18a of the rotor.

When the brake is released the shoe portion 38a will be urged to retracted position by the return springs 48a. When the rotor is turning in opposite direction and the brake is applied, the engagement of facing 37a on the pistons 35a will produce clockwise actuating force on the brake unit, whereupon camming devices 42a will bias the brake unit, shoe portion 38a of the brake unit to applied position against surface 18a of the rotor 12a.

Where it is desired to provide pistons on only one side of the brake units, spreading of the pistons 35a into engagement with surface 16a of the rotor 12 causes shifting of the brake unit 30a toward the right. This lateral movement of the brake unit 30a brings friction material lining 37a on side 52a into forcible engagement with surface 14a of the rotor 12a, thus gripping the rotor between the two spaced sides 52a and 54a. When the brake unit shifts as a reaction from engagement of the disk elements, camming devices 42a translate shifting of the brake unit into radial applying thrust on the shoe portion of the brake unit in the same manner as in the previous embodiment.

In each of the embodiments the torque reaction from the axially actuated friction elements causes shifting of the brake unit which in turn is translated by camming device into a radial applying force on a second friction element, the shoe portion. The anchoring load from both the axially actuated friction elements and the radially applied friction element is transmitted through the camming devices to a fixed member. Thus, I realize a duality of function from the camming devices since they serve not only as applying means for the shoe brake portion of the unit but also as part of the anchoring system for the brake by limiting movement of the friction unit.

Although the invention has been disclosed herein in connection with certain selected embodiments, it will be apparent to those skilled in the art that various changes in the location and design of the components may be made to suit requirements.

I claim:

1. A brake comprising a rotatable member having two oppositely facing disk surfaces joined by a substantially cylindrical surface, a U-shaped cross section brake unit the sides thereof being arranged contiguously to the surfaces of said rotatable member to be engageable therewith, a nonrotatable torque-taking member having a flanged portion adjacent the side of said unit engageable with the cylindrical surface of said rotatable member, said brake unit having at least one axially actuated disk element engageable with one of the disk surfaces of said rotatable member to thereby grip said rotatable member therebetween, and a plurality of anchoring devices which resist circumferentially the tendency of said brake unit to move with said rotor, said anchoring devices being interposed between said brake unit and said nonrotatable member, said anchoring devices being constructed as a cam means to force said unit radially against the cylindrical surface of said rotatable member when said unit moves circumferentially as a reaction from engagement of said disk elements with said rotatable member.

2. A kinetic energy absorbing device comprising a rotor, a nonrotatable support member, a U-shaped cross section brake unit floatably carried by said support member and straddling said rotor with its sides adjacent cylindrical and oppositely facing surfaces of said rotor, said brake unit including axially actuated friction producing elements adapted to grip said rotor, torque reaction from engagement of said axially actuated friction elements and said rotor causing movement of said unit, and a plurality of camming devices between said brake unit and support member to translate circumferential movement of said unit into radial applying thrust on said unit thereby forcibly engaging the cylindrical surface of said rotor with the adjacent side of said unit, the anchoring load from engagement of said brake unit with said rotor being transmitted through said camming devices, to said nonrotatable support member.

3. A brake comprising a torque-taking member, a pair of brake units floatably supported by said member and each including axially applied friction elements and a radially applied friction element, a rotatable drum having three friction element engaging surfaces, a plurality of camming devices interposed between each of said units and said torque-taking member, means for applying said axially applied friction elements into engagement with said drum, said camming devices being arranged to impart applying thrust on said radially actuated friction element upon movement of said unit produced by engagement of said axially applied friction elements with said rotatable drum, and resilient means yieldably urging said radially applied friction element to retracted position.

4. brake comprising a rotatable member having three friction element engaging surfaces, a torque-taking member, a pair of brake units floatably carried by said torque-taking member and each including oppositely-facing axially movable friction elements and a radially applied shoe element, each of said units adapted for limited circumferential movement produced as a torque reaction from engagement of said axially movable friction elements with said rotatable member, a plurality of camming devices arranged radially between said torque-taking member and brake units to develop radial applying thrust on the shoe elements of said units thereby engaging said shoe elements with said rotatable member, and means for urging said shoe elements to retracted position.

5. In a brake, a U-shaped cross section drum, a support member, a brake unit floatably mounted on said support member internally of said drum and including oppositely-facing axially actuated first friction elements engageable with the sides of said drum to generate braking torque utilizable for shifting said unit, a radially applied friction element of said unit engageable with the cylindrical surface of said drum, and a plurality of composite actuating and anchoring means combined with said support member and unit to bias said radially actuated friction element to applied position, said means serving to anchor said unit by limiting the shifting movement thereof.

6. A kinetic energy absorbing device comprising a rotatable member, a brake unit including oppositely-facing axially movable disk elements and a radially applied shoe element each engageable with a surface of said rotatable member, a nonrotatable torque-taking member floatably supporting said unit anchoring means provided radially intermediate said brake unit and torque-taking member and arranged to bias said shoe element into engagement with said rotatable member when said brake unit is moved circumferentially by the torque reaction from engagement of said disk elements with said rotatable member, and means for retracting said shoe element from engagement with said rotatable member.

7. A brake comprising a U-shaped cross section drum, a nonrotatable torque-taking member, a brake unit floatably carried by said torque-taking member and including oppositely-facing axially applied friction elements engageable with spaced apart sides of said drum, and a radially outwardly applied shoe element engageable with a cylindrical surface of said drum, and anchoring and camming means combined with said unit and torque-taking member to bias said shoe element to applied position as said unit is moved by reaction from engagement of said axially applied friction elements with said drum.

8. In combination with a rotatable member, a brake unit comprising axially applied friction elements, a radially applied shoe element, and combination actuating and anchoring means for said unit consisting of camming devices biasing said shoe element radially to applied position as said unit is circumferentially shifted by engagement of said axially applied friction elements with said rotatable member, said means serving to carry the anchoring load of said unit by limiting the extent of movement thereof.

9. In a brake, a rotatable member having two substantially flat braking surfaces joined by an annular braking surface, a plurality of brake units for impeding the rotation of said rotatable member, a fixed torque-taking member, each of said units being floatably mounted on said torque-taking member and limitedly movable relatively thereto in both a circumferential and radial sense, a pair of axially-applied friction elements forming a part of each of said units and engageable with the substantially flat braking surfaces of said rotatable member to produce slight circumferential movement of the unit, a radially-applied friction element of said unit engageable with the annular braking surface of said rotatable member, and combined anchoring and camming means provided radially intermediate each brake unit and said torque-taking member to produce application of said radially-applied friction element upon circumferential movement thereof produced by the engagement of said axially-applied friction elements with said rotatable member.

10. A brake comprising a rotatable member having two spaced-apart disk surfaces joined by a substantially annular surface, a nonrotatable torque-taking member, a plurality of brake units floatably carried by said torque-taking member, each of said brake units including oppositely-facing axially-reciprocable friction elements engageable with the disk surfaces of said rotatable member, actuating means embodied with said friction elements to produce axial movement thereof, a radially-applied friction element engageable with the substantially annular surface of said rotatable member, and means interconnecting said axially-reciprocable elements and radially-applied friction elements, each of said brake units being movable by braking torque of said axially-reciprocable friction elements, a plurality of camming devices combined with said brake units and torque-taking member to exert applying thrust on said radially-applied friction element, and resilient means urging said radially-applied friction element to retracted position.

11. A brake unit comprising a supporting member, a U-shaped cross-section housing floatably combined with said supporting member, friction means reciprocably received in each side of said housing to be engageable with a rotatable member thereby causing shifting of said unit, an arcuate shoe friction element of said unit, and composite anchoring and actuating means including a plurality of camming devices interposed between said supporting member and housing to translate shifting of said unit as applying thrust on said shoe element, said composite means absorbing the anchoring load of said unit by limiting the extent of shiftable movement thereof.

12. In combination with a rotatable member having a plurality of friction element engaging surfaces, a brake unit comprising oppositely-facing disk friction elements engageable with said rotatable member, a fixed supporting member floatably carrying said unit, a shoe friction element of said unit engageable with said rotatable member, and camming devices combined with said supporting member and brake unit to impart applying thrust on said unit when said unit shifts, said camming devices serving to anchor said unit by limiting the extent of shifting thereof.

13. In a kinetic-energy-absorbing device, a free-floating friction unit capable of both axial and circumferential movement, said unit including both oppositely-facing axially-applied friction elements and a radially-applied friction element, a fluid motor combined with said unit and operatively connected to said axially-applied friction elements, and camming means which radially biases said unit to apply the radially-applied friction element when said unit moves circumferentially, said camming means providing anchoring means for said unit by limiting the circumferential movement thereof.

References Cited in the file of this patent

UNITED STATES PATENTS

| | | |
|---|---|---|
| 1,603,963 | Liebowitz | Oct. 19, 1926 |
| 1,972,288 | Brewster | Sept. 4, 1934 |
| 2,050,902 | Tatter | Aug. 11, 1936 |
| 2,065,382 | Levy | Dec. 22, 1936 |
| 2,302,495 | Freer | Nov. 17, 1942 |
| 2,554,039 | Lepersonne | May 22, 1951 |
| 2,602,525 | Jurgens | July 8, 1952 |
| 2,751,046 | Tack | June 19, 1956 |

FOREIGN PATENTS

| | | |
|---|---|---|
| 490,476 | France | Apr. 24, 1919 |
| 707,074 | Germany | June 12, 1941 |
| 739,196 | Germany | Sept. 14, 1943 |

UNITED STATES PATENT OFFICE

CERTIFICATE OF CORRECTION

Patent No. 2,915,145                  December 1, 1959

Joseph L. Mossey

It is hereby certified that error appears in the printed specification of the above numbered patent requiring correction and that the said Letters Patent should read as corrected below.

Column 4, line 43, after "devices" strike out the comma; line 60, before "brake" insert -- A --; column 5, line 18, after "unit" insert a comma.

Signed and sealed this 20th day of September 1960.

(SEAL)
Attest:

KARL H. AXLINE
Attesting Officer

ROBERT C. WATSON
Commissioner of Patents